United States Patent [19]

Allberry et al.

[11] Patent Number: 5,237,024

[45] Date of Patent: Aug. 17, 1993

[54] PREPARING MONOALKENYL AROMATIC MONOMER-MALEIC HALF ESTER COPOLYMER

[75] Inventors: David E. Allberry, Enfield, Conn.; Kang I. Lee, Longmeadow, Mass.

[73] Assignee: Monsanto Company, St. Louis, Mo.

[21] Appl. No.: 897,166

[22] Filed: Jun. 11, 1992

[51] Int. Cl.$^5$ .................. C08F 2/06; C08F 218/14
[52] U.S. Cl. ..................... 526/75; 526/213; 526/216; 526/318; 525/329.5; 525/366; 524/773; 524/854; 524/924
[58] Field of Search ............... 526/75, 216, 272, 320, 526/213, 318; 525/366, 329.5; 524/773, 854

[56] References Cited

U.S. PATENT DOCUMENTS

| | | | |
|---|---|---|---|
| 2,537,017 | 1/1951 | Barett ...................... | 260/45.2 |
| 2,647,886 | 8/1953 | Seymour ................... | 260/78.5 |
| 2,675,370 | 4/1954 | Barett ...................... | 260/78.5 |
| 2,723,195 | 11/1955 | Blake ....................... | 92/3 |
| 3,085,994 | 4/1963 | Muskat ..................... | 260/78.5 |
| 3,423,355 | 1/1969 | Vandel et al. ............. | 260/32.8 |
| 3,458,484 | 7/1969 | Zimmerman et al. ....... | 526/272 X |
| 3,720,651 | 3/1973 | Imoto et al. .............. | 526/272 X |
| 3,931,092 | 1/1976 | Ramlow et al. ........... | 526/272 X |

FOREIGN PATENT DOCUMENTS 1091208  5/1986  Japan ................... 526/272

*Primary Examiner*—Fred Teskin
*Attorney, Agent, or Firm*—Michael J. Murphy; Mark F. Wachter

[57] ABSTRACT

A process which comprises reacting maleic anhydride and a primary or secondary $C_1-C_{18}$ alcohol to form a maleic half ester, and then polymerizing the half ester and monoalkenyl aromatic monomer in ester solvent in the presence of a catalyst to form a solution of monoalkenyl aromatic monomer-maleic half ester copolymer having a weight average molecular weight of at least 110,000 Daltons. After formation of the copolymer, the reaction solution is neutralized to form a mixture of an alkaline salt solution of the copolymer and solvent and then the solvent is removed from the mixture.

17 Claims, No Drawings

PREPARING MONOALKENYL AROMATIC MONOMER-MALEIC HALF ESTER COPOLYMER

BACKGROUND OF THE INVENTION

This invention relates to a process for preparing copolymers of alkenyl aromatic monomer and alkyl half esters of maleic anhydride and more particularly to a process for preparing high molecular weight species of such copolymers.

Alkenyl aromatic monomer (e.g. styrene and substituted styrene)—maleic half ester copolymers and polymerization processes for their preparation are known. Such polymers, including alkaline salt solutions thereof, are used in coatings (e.g. textile), adhesive applications and as photoresist binders. A further use is as paper sizing agents to improve properties of the paper, such as strength, ink retention, printability and the like. In such paper coating applications, the alkyl half ester component of the polymer is important to the capability of the polymer to form a film on the paper surface. High polymer molecular weight (>110,000 Daltons weight average) and lack of color in solutions of the polymer are additional important properties deemed indispensable for such paper sizing applications. Adequate molecular weight has been achieved in the past by bulk polymerizing in two stages—initially to a very viscous syrup followed by further polymerization to a solid in a plate and frame press. Before deposition on the paper, the solid high molecular weight polymer is dissolved in aqueous ammonia or caustic soda. Such a multi-step process using an antiquated plate and frame press is undesirably labor intensive.

Also disclosed in the prior art to form these types of polymers are so-called "solvent non-solvent" processes. Note, for example, U.S. Pat. No. 3,085,994—col. 1, lines 20–27. In such a process the monomers forming the polymer are soluble in the solvent polymerization medium but the polymer is insoluble so that once formed during polymerization it immediately precipitates out of solution. These polymerization systems, however, are incapable of routinely providing the high molecular weight (>110,000 Daltons) required for the noted paper sizing applications.

It would be desirable to provide a process for preparing high molecular weight styrene and substituted styrene maleic half ester copolymers which is more tractable than those in the prior art.

SUMMARY OF THE INVENTION

Now improvements have been made eliminating process difficulties encountered in the prior art for forming styrene (including substituted styrene)—maleic half ester copolymers.

Accordingly, a principal object of this invention is to provide a process for preparing high molecular weight alkenyl aromatic monomer-maleic half ester copolymers.

A specific object is to provide a tractable process for preparing aqueous alkaline solutions of such high molecular weight copolymers.

Other objects of this invention will in part be obvious and will in part appear from the following detailed description and claims.

These and other objects are accomplished by a process which comprises reacting maleic anhydride and a primary or secondary $C_1$–$C_{18}$ alcohol to form a maleic half ester, and then polymerizing the half ester and monoalkenyl aromatic monomer in ester solvent in the presence of a catalyst to form a solution of monoalkenyl aromatic monomer-maleic half ester copolymer having a weight average molecular weight of at least 110,000 Daltons.

An aqueous alkaline salt solution of such high molecular weight copolymer is prepared by neutralizing the polymerization solution with an aqueous alkaline solution and removing the organic solvent from the mixture. To promote high molecular weight, the weight ratio of unpolymerized reactants to ester solvent should be at least about 3, preferably at least 4.5:1.

DETAILED DESCRIPTION OF THE INVENTION

The copolymers of the process of this invention are formed of polymerized monoalkenyl aromatic monomer and one or more maleic anhydride partial ester(s).

Exemplary of monoalkenyl aromatic monomers which may be used in preparing the copolymers are styrene; alpha-alkyl monoalkenyl monoaromatic compounds, e.g. alpha-methyl-styrene, tert-butylstyrene, alpha-ethylstyrene, alpha-methyl-vinyltoluene, alpha-methyl dialkylstyrenes, etc.; substituted alkyl styrenes, e.g. vinyl toluene, o-ethylstyrene, p-ethylstyrene, 2,4-dimethylstyrene, etc.; substituted halostyrenes, e.g. o-chlorostyrene, p-chlorostyrene, o-bromostyrene, 2,4-dichlorostyrene, 2,4-dibromostyrene, etc.; alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monoalkenyl aromatic monomers may be employed.

The maleic anhydride partial ester component is prepared by partially esterifying maleic anhydride and a primary or secondary $C_1$–$C_{18}$ alcohol including mixtures of such primary and secondary alcohols. Usable primary alcohols include methanol, ethanol, n-propanol, n-butanol, isobutanol, n-pentanol, n-hexanol, n-heptanol, n-octanol, n-decanol and higher alcohols up to n-octadecanol. Usable secondary alcohols include isopropanol, secondary-butanol etc. A preferred maleic anhydride partial ester is prepared from a mixture of methanol and isobutanol to form a mixture comprising the methyl and isobutyl half esters of maleic anhydride.

The composition of the constituents of these copolymers ranges from a molar ratio of monoalkenyl aromatic monomer (e.g. styrene) to maleic anhydride partial ester of 1:1 to 1.6:1, preferably 1.1:1 to 1.4:1. For the preferred mixture of maleic anhydride partial esters of methanol and isobutanol, the molar ratio of isobutyl maleate to methyl maleate should be in the range of 3:2 to 1:3.

The molecular weight of the copolymers is relatively high at greater than 110,000 Daltons determined as weight average measured using size exclusion chromatography using three detectors—i.e. low angle laser light scattering, a Waters Model 401 Differential Refractive Index Detector and a multi wave length UV instrument. When measuring the half ester copolymer molecular weight, tetrahydrofuran was the solvent and polystyrene the molecular weight calibration standard; when measuring the molecular weight of the alkaline salt solution, water was the solvent and polysaccharide the standard. For the preferred paper sizing applications such weight average molecular weight of the copolymers is preferably at least 150,000 Daltons, most preferably between 170,000 to 200,000 Daltons.

The process of the invention prepares the noted high molecular weight copolymers by solution polymerization in an ester solvent in which both the unpolymerized monomeric components and the copolymer are soluble. As such solvent, any organic ester or organic ester mixture can be used which is liquid at the polymerization temperature. Exemplary usable organic ester solvents are acetates such as $C_1$-$C_6$ acetates; formates; propionates; n-butyrates; n-valerates; benzoates and the like. The esterification step forming the maleate half ester is first carried out followed by polymerization in the same or different vessel. Preferably the copolymers are prepared by in situ partial esterification of maleic anhydride with the desired alcohol or mixture of alcohols followed by solution polymerization in the ester solvent of the preformed maleate half ester(s) with styrene at a temperature of about 70° to 150° C. in the presence of a catalyst. Peroxide or hydroperoxide catalysts or mixtures thereof are usable. Representative catalysts are t-butyl peroctoate, benzoyl peroxide, t-butyl hydroperoxide, t-butyl peroxide, cumene hydroperoxide and cumene peroxide or azo-dinitriles such as azo-di(isobutyronitrile) and azo-di(cyclohexanecarbonitrile).

Two features of the organic ester solvent solution polymerization process of the invention promote desired development of high molecular weight in the copolymers. The weight ratio of unreacted polymerizing components (styrene, half ester(s), maleic anhydride) to ester solvent, particularly during the early phase of the polymerization cycle is kept relatively high while still maintaining the reaction medium as a solution. Generally this means such ratio should be at least about 3 and preferably at least 4.5:1. After about 20-30% (based on total polymerization time) of the cycle, the ratio can be lowered by adding solvent to facilitate mixing and high polymer conversion. Also, catalyst concentration throughout the polymerization cycle should be as low as possible consistent with maintaining a reasonable polymerization rate. Depending on catalyst choice, concentrations of about 0.1 to 3 wt. % generally achieve this, preferably 0.3 to 1 wt. % based on total monomer (styrene, maleate and maleic anhydride).

To facilitate use, particularly as paper sizing compositions, the copolymer of the solution polymerization process is formulated into an aqueous alkaline solution which is desirably free of significant color formation i.e. less than a value of 2 as measured using ASTM D1544-80, standard test method for color of liquids (Gardner Color Scale). Such alkaline salt solution is prepared by precipitating the copolymer from the solution polymerization reaction medium after completion of polymerization, removing the solvent and neutralizing the copolymer with aqueous ammonia or aqueous caustic soda. A preferred alternative procedure combines the aqueous alkaline solution and the polymerization solution containing the dissolved polymer thereby neutralizing the dissolved polymer and then removes (e.g. by distillation or equivalent method) the solvent. Since the ester solvent is essentially immiscible in water virtual complete removal can be achieved. When following the latter procedure, the polymerization solution is preferably added to the alkaline solution rather than vice versa in order to minimize polymer precipitation. With the preferred tractable procedure for preparing the essentially organic-solvent-free aqueous alkaline salt solution of the copolymer for paper sizing applications, the polymer conveniently remains in solution until dried on the paper at the completion of the downstream sizing application. Polymer solids content in the aqueous alkaline solution is usually about 7 to 15 wt. % depending on polymer molecular weight. At such solids content, the viscosity will be about 10 to 5000 cps (0.01-5 Pa.s). The pH should be adjusted to about 9 to 10.

Exemplary of the invention are the following specific examples.

EXAMPLE 1

Preparation of Aqueous Ammonium Salt Solution of a Copolymer of Styrene, Mono-Isobutyl Maleate and Mono-Methyl Maleate Maleic anhydride (85.05 gm, 0.87 mole), isobutanol (41.55 gm, 0.56 mole) and methanol (6.89 gm, 0.22 mole) were charged to a kettle, heated to 80° C. and a 40° to 50° C. exotherm allowed to occur. The solution was then cooled to 80° C. and stirred for an additional 2 hours. At the end of this esterification step forming the methyl and isobutyl half esters of maleic anhydride, the solution was cooled to 50° C. Organic ester solvent as ethyl acetate (50 gm) and styrene monomer (106.51 gm, 1.02 mole) were added to 133.49 gm of the maleic anhydride half ester solution. A solution of tert-butyl peroctoate (2.4 gm) catalyst in ethyl acetate (20 ml) was added to the kettle through an addition funnel in nine separate slugs over four hours. Also ethyl acetate was added in seven separate slugs over four hours. Table I charts the progress of the solution polymerization reaction and the details of the catalyst solution and ethyl acetate solvent additions. A refluxing condition was maintained throughout polymerization to insure proper heat removal. Batch temperature in Table I is the temperature of the refluxing polymerization reaction mixture. After polymerization was essentially completed, 334 ml of ethyl acetate was further added to reduce the viscosity of the polymer solution. Total polymer solids at this point was 30 wt. %.

TABLE I

| | Catalysts and Solvents Additions | | |
|---|---|---|---|
| Reaction (min) | Batch Temperature (°C.) | Catalyst Slug (ml) | Solvent Slug (ml) |
| 05 | 49 | 1 | 0 |
| 30 | 119 | 1 | 0 |
| 50 | 114 | 1 | 0 |
| 90 | 111 | 1 | 20 |
| 120 | 109 | 1 | 20 |
| 150 | 99 | 1 | 15 |
| 180 | 94 | 4 | 15 |
| 210 | 91 | 4 | 10 |
| 240 | 87 | 6 | 30 |
| 300 | 85 | — | 100 |
| 375 | 82 | — | remaining 334 |
| 560 | 78 | — | |

During the first 90 min. of the total 375 min. polymerization cycle (24% based on time) unreacted monomer/solvent ratio was 4.8.

After addition of the last solvent slug (time=375 min), the polymerization mixture was stirred for 85 more mins. The final batch temperature was 78° C. The polymer solution was cooled to 70° C. Polymer conversion both gravimetrically and by gas chromatograph (GC) analyses was determined from an aliquot sample.

Conversion was 100% gravimetrically and 99.99% by residual styrene analysis with GC.

From an aliquot of polymer solution, the polymer was precipitated into hexane, the solid polymer filtered and dried. Molecular weight (weight average) was 180,000 Daltons determined by size exclusion chromatography using polystyrene as standard.

To a separate agitated kettle fitted with a distillation apparatus was charged concentrated 29% ammonium hydroxide (34 gm) and 85° C. tap water (1043 gm). 410 gm of the polymer solution referred to above was slowly added through an addition funnel over ½ hour to the kettle containing the ammonium hydroxide in order to neutralize the polymer in the solution. Since ethyl acetate is essentially immiscible in water, a two layer mixture was formed of the solvent and water solution after agitation was stopped. Ethyl acetate was then removed from the mixture by distillation with the final distillation temperature maintained at 99° C. for 10 mins. to promote complete removal of ethyl acetate. The resulting aqueous ammonium salt solution was cooled to 25° C. and pH adjusted to 9.3. The solution was water clear to the eye (Gardner Color—0) and had a Brookfield viscosity of 340 cps (0.34 Pa.s). Residual ethyl acetate in the solution was less than 0.04 wt. % by gas chromatography. Weight average molecular weight (polysaccharide standard) was 180,000 Daltons.

EXAMPLE 2

The procedure of Example 1 was repeated through the end of polymerization. The polymer solution was coagulated by pouring it into a large excess of hexane. The coagulated polymer was washed, filtered and dried overnight in a vacuum oven at 30 mmHg, 60° C. The white powdery polymeric material (123 gm) was added to a solution of concentrated ammonium hydroxide (34 gm) and tap water (1043 gm) at 25° C. and heated to 85° C. The pH was adjusted to 9.3 and resulting in a water clear solution as in Example 1. The weight-average molecular weight of the polymer in the final solution was identical with that of Example 1.

COMPARATIVE EXAMPLE C1

This compares results using ketonic solvents disclosed in U.S. Pat. No. 3,423,355 in the solution polymerization and the polymer molecular weight obtained using polymerization procedures according to such patent.

A) The procedure of Example 1 herein was repeated except that instead of ethyl acetate the polymerization solvent was methyl ethyl ketone (210 ml). The resulting aqueous alkaline salt solution of the neutralized polymer had a distinct greenish-gold color (9 in the Gardner Color test) which is unacceptable in the paper sizing applications of primary interest to the present invention.

B) The procedure of Example 1 herein was repeated except that instead of ethyl acetate the polymerization solvent was acetone, (210 ml). The resulting aqueous alkaline salt solution was cloudy in appearance and deemed unacceptable for the noted application.

C) To determine the molecular weight of styrene-maleic anhydride polymer formed according to the U.S. Pat. No. 3,423,355 patent, the procedure of Example 1 of such patent was carried out, except that the polymerization catalyst used was t-butyl peroctoate instead of diisopropyl peroxy dicarbonate. This change was not considered to affect the polymer obtained. The molecular weight of the polymer formed using the aqueous size exclusion chromatography procedure of Example 1 herein was 60,000 Daltons. This is significantly below the minimum 110,000 Daltons lower level of interest in the different styrene-maleic half ester copolymers of this invention.

The preceding description is for illustration only and is not to be taken in a limited sense. Various modifications and alterations will be readily suggested to persons skilled in the art. It is intended, therefore, that the foregoing be considered as exemplary only and that the scope of the invention be ascertained from the following claims.

We claim:

1. A process which comprises reacting maleic anhydride and a primary or secondary $C_1$–$C_{18}$ alcohol to form a maleic half ester, and then polymerizing the half ester and monoalkenyl aromatic monomer in ester solvent in the presence of a catalyst to form a solution of monoalkenyl aromatic monomer-maleic half ester copolymer, the weight ratio of polymerizing reactants to ester solvent being adequate to provide a weight average molecular weight of the copolymer of at least 110,000 Daltons.

2. The process of claim 1 wherein the weight ratio of polymerizing reactants to ester solvent is at least about 3:1.

3. The process of claim 1 including the steps of neutralizing the solution to form a mixture of an alkaline salt solution of the copolymer and solvent and then removing the solvent from the mixture.

4. The process of claim 2 wherein the catalyst concentration during polymerization is about 0.1 to 3 weight % based on the total weight of monomers.

5. The process of any of claims 1, 2, 3 or 4 wherein the solvent is ethyl acetate.

6. The process of claim 5 wherein the weight average molecular weight of the copolymer is at least 150,000 Daltons.

7. A process for preparing an aqueous alkaline salt solution of high molecular weight styrene-maleic anhydride partial ester copolymer which comprises:
   i) reacting maleic anhydride and a primary or secondary $C_1$–$C_{18}$ alcohol or a mixture of such a primary or secondary alcohol to form one or more maleic half esters;
   ii) polymerizing the one or more half esters and styrene in the presence of a catalyst in ester solvent to form a solution of styrene-maleic half ester copolymer the weight ratio of polymerizing reactants to ester solvent being adequate to provide copolymer weight average molecular weight of at least 110,000 Daltons; and then
   iii) neutralizing the reaction solution to form the aqueous alkaline salt solution.

8. The process of claim 7 wherein a mixture of ester solvent and alkaline salt solution is formed during neutralizing and including the step of removing the solvent from the mixture.

9. The process of claim 7 wherein neutralizing occurs by adding the polymerization solution to a water solution of alkali.

10. The process of claim 9 wherein the weight average molecular weight is at least 150,000 Daltons.

11. The process of claim 10 wherein the ester solvent is ethyl acetate.

12. The process of claim 10 wherein the weight ratio of polymerizing reactants to ester solvent is at least about 3:1.

13. The process of claim 11 wherein the alcohol is methanol, isobutanol or a mixture of methanol and isobutanol.

14. The process of claim 13 wherein the alcohol is a mixture of methanol and isobutanol.

15. In a solution polymerization process for preparing high molecular weight monoalkenyl aromatic monomer-maleic half ester copolymers, the improvement which comprises using organic ester as the solvent during polymerization at a weight ratio of polymerizing reactants to organic ester adequate to provide a copolymer weight average molecular weight of at least 110,000 Daltons.

16. The process of claim 15 wherein the monoalkenyl aromatic monomer is styrene and the maleic half ester comprises the methyl half ester of maleic anhydride and the isobutyl half ester of maleic anhydride.

17. The process of claim 16 wherein the organic ester is ethyl acetate.

* * * * *